(12) United States Patent
Bauer

(10) Patent No.: US 7,658,350 B2
(45) Date of Patent: Feb. 9, 2010

(54) RETAINING MEMBER

(75) Inventor: Christian Bauer, Karlsfeld (DE)

(73) Assignee: ITW Automotive Products GmbH & Co KG, Iserlohn (DE)

( * ) Notice: Subject to any disclaimer, the term of this patent is extended or adjusted under 35 U.S.C. 154(b) by 1140 days.

(21) Appl. No.: 10/767,745

(22) Filed: Jan. 30, 2004

(65) Prior Publication Data

US 2004/0188570 A1    Sep. 30, 2004

(30) Foreign Application Priority Data

Feb. 18, 2003   (DE) ............................... 103 06 905

(51) Int. Cl.
*F16L 3/08* (2006.01)
(52) U.S. Cl. ............................. 248/65; 24/458; 24/531; 248/74.2
(58) Field of Classification Search ................. 248/65, 248/67.7, 68.1, 74.2, 316.1, 316.7; 24/458, 24/462, 531, 16 R, 17 R
See application file for complete search history.

(56) References Cited

U.S. PATENT DOCUMENTS

| | | | | | |
|---|---|---|---|---|---|
| 2,655,703 | A | * | 10/1953 | Flora | 24/16 R |
| 3,126,184 | A | * | 3/1964 | Kropp | 248/73 |
| 4,260,123 | A | * | 4/1981 | Ismert | 248/74.1 |
| 4,441,677 | A | * | 4/1984 | Byerly | 248/74.3 |
| 4,467,988 | A | * | 8/1984 | Kraus | 248/68.1 |
| 5,033,701 | A | * | 7/1991 | Kraus | 248/68.1 |
| 5,458,303 | A | * | 10/1995 | Ruckwardt | 248/74.2 |
| 5,460,342 | A | | 10/1995 | Dore et al. | |
| 5,464,179 | A | * | 11/1995 | Ruckwardt | 248/68.1 |
| 5,947,426 | A | * | 9/1999 | Kraus | 248/74.2 |
| 6,070,836 | A | * | 6/2000 | Battie et al. | 248/68.1 |
| 6,073,891 | A | | 6/2000 | Humber | |
| 6,126,119 | A | * | 10/2000 | Giangrasso | 248/58 |
| 6,290,201 | B1 | * | 9/2001 | Kanie et al. | 248/636 |
| 2001/0019091 | A1 | * | 9/2001 | Nakanishi | 248/68.1 |
| 2002/0063189 | A1 | * | 5/2002 | Coudrais | 248/68.1 |
| 2004/0065785 | A1 | * | 4/2004 | Miura et al. | 248/62 |
| 2004/0113027 | A1 | * | 6/2004 | Nakanishi | 248/68.1 |
| 2004/0144897 | A1 | * | 7/2004 | Maruyama | 248/68.1 |
| 2004/0217236 | A1 | * | 11/2004 | Shibuya | 248/68.1 |

FOREIGN PATENT DOCUMENTS

| | | | |
|---|---|---|---|
| DE | 36 02 625 | 3/1987 | |
| DE | 4034545 A1 | 5/1992 | .................... 3/22 |
| DE | 296 20 300 | 3/1997 | |
| DE | 198 10 834 | 9/1998 | |

(Continued)

OTHER PUBLICATIONS

JP Office Action for JP2004-041804 mailed Aug. 11, 2009.

*Primary Examiner*—A. Joseph Wujciak, III
(74) *Attorney, Agent, or Firm*—Lowe Hauptman Ham & Berner LLP

(57) ABSTRACT

A retaining member for holding and supporting an elongated element from a support includes a base portion and a holding portion. The base portion is attachable to the support. The holding portion is connected to the base portion and has a recess for holding the elongated element therein. The recess includes a tubular portion and a plurality of spaced ribs extending radially inwardly from the tubular portion to have different radial heights.

25 Claims, 5 Drawing Sheets

FOREIGN PATENT DOCUMENTS

| | | |
|---|---|---|
| DE | 198 57 853 | 6/2000 |
| EP | 0 838 626 | 4/1998 |
| EP | 1 036 966 | 9/2000 |
| JP | 8200551 A | 8/1996 |
| JP | 9135520 A | 5/1997 |
| JP | 2002238134 A | 8/2002 |
| JP | 2002295585 A | 10/2002 |
| WO | 02/065009 | 8/2002 |

* cited by examiner

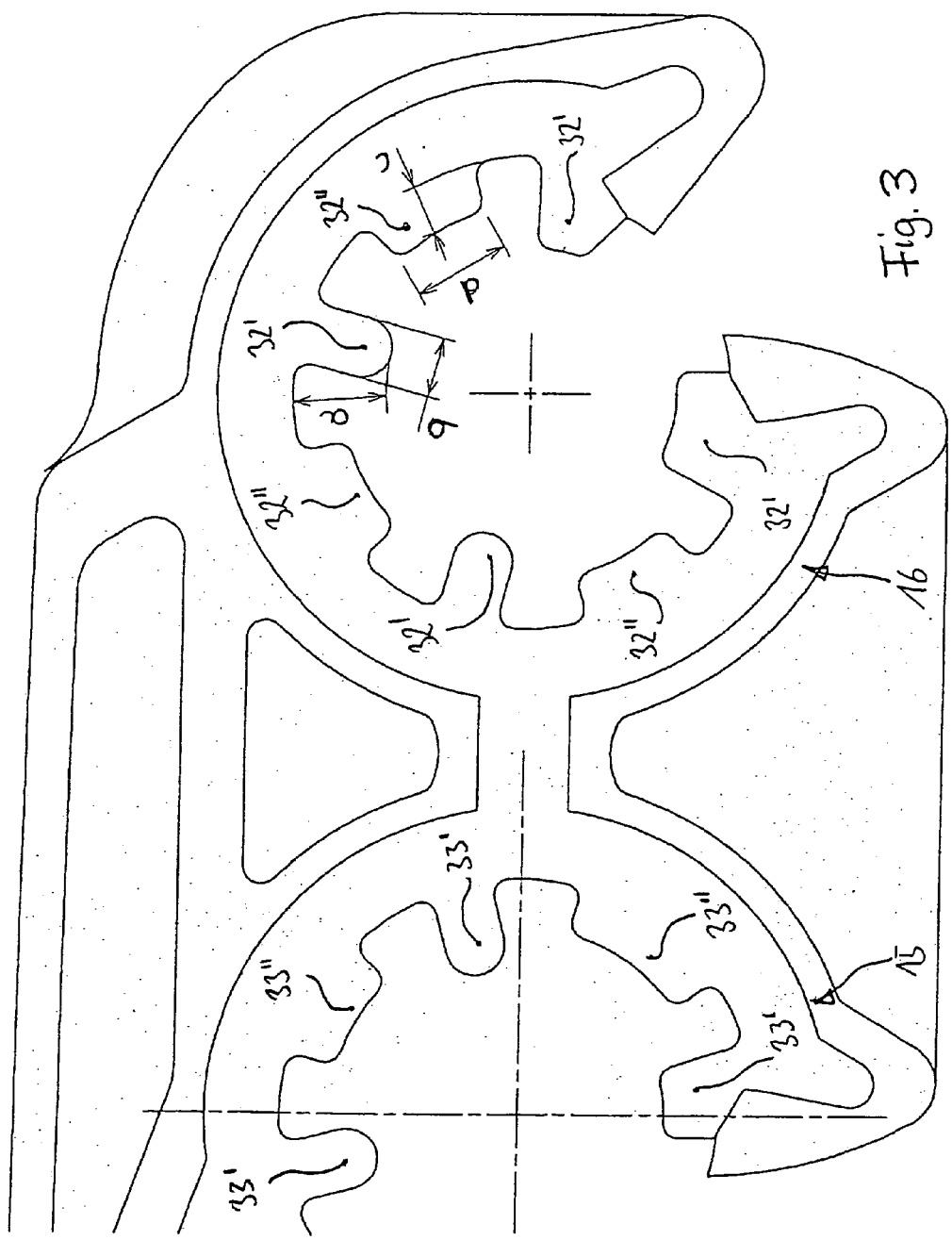

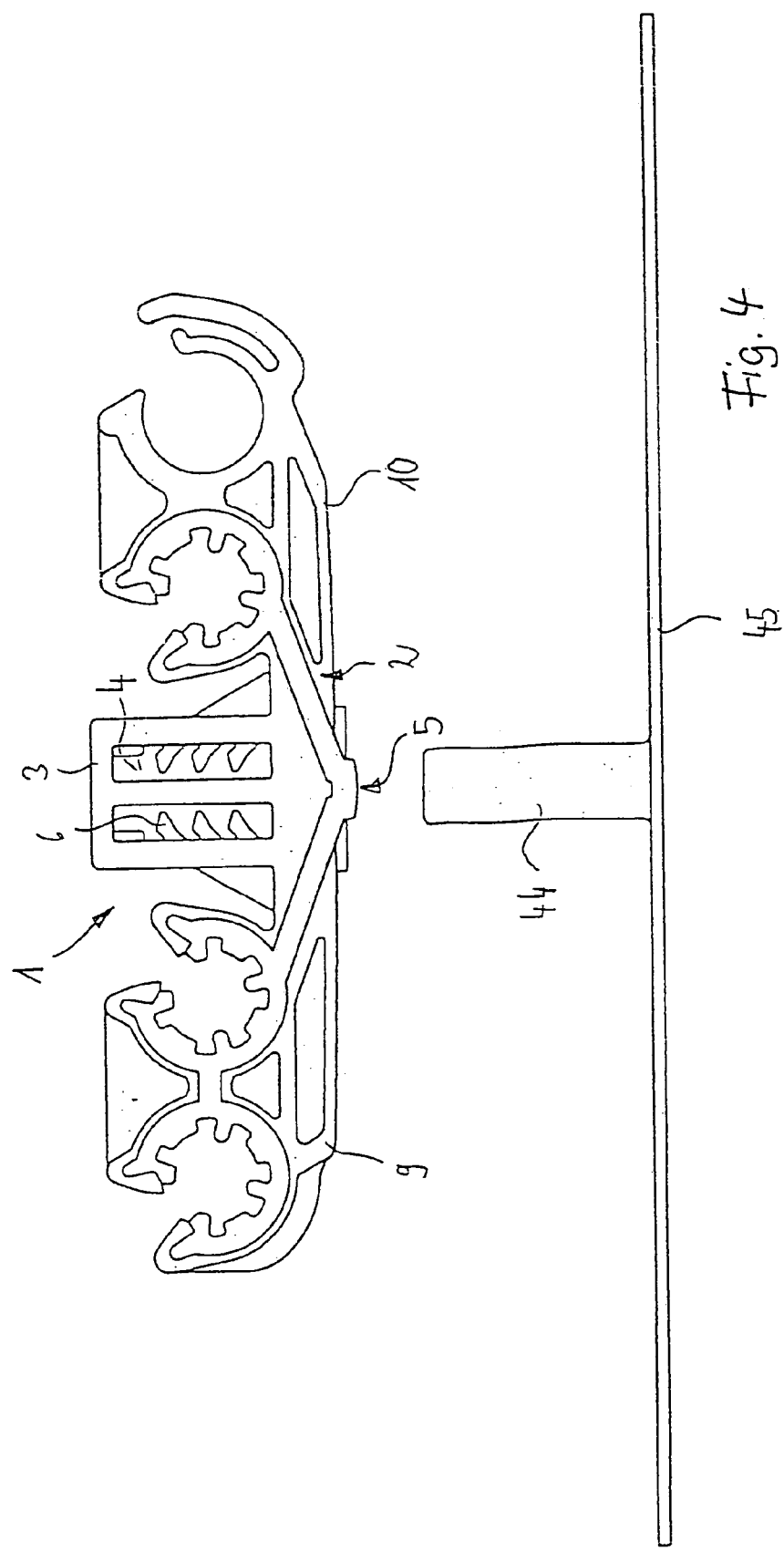

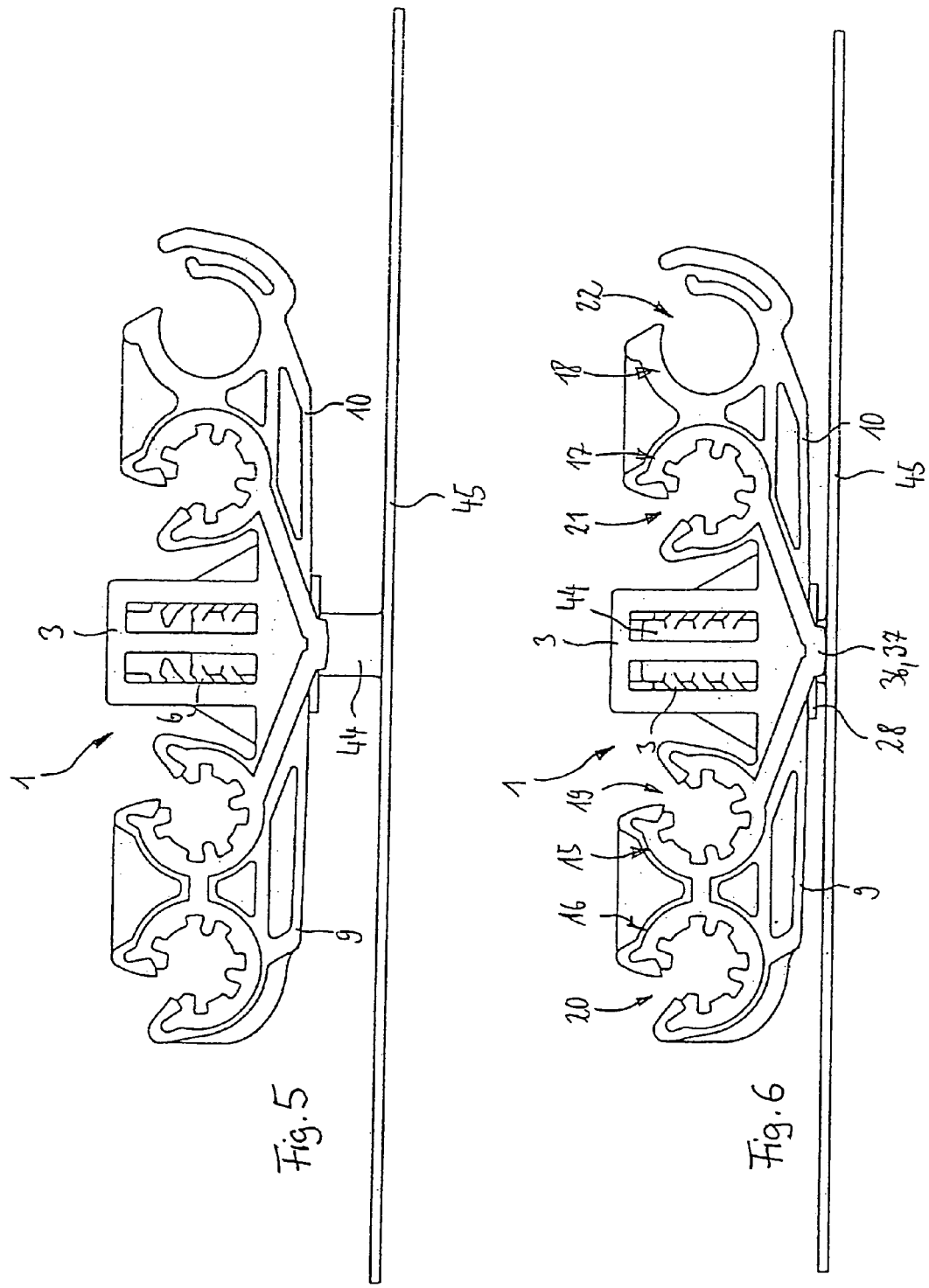

RETAINING MEMBER

FIELD OF THE INVENTION

Background of the Invention

The invention relates to a retaining member of a plastic material which is useful for holding lines on a support.

SUMMARY OF THE INVENTION

When pipes, flexible tubes, and other lines through which pressure pulses are transmitted are mounted on a support by means of retaining members it is desirable to isolate the pressure pulses from the support. For example, this problem occurs in mounting brake lines on the body-in-white sheets of motor vehicles. Here, the transmission of pressure surges can cause vibrations in the audible range which can even be intensified by resonant bodies existing in the motor vehicle. Avoiding the transmission of the pressure surges onto the support from the lines is also called "acoustic isolation".

DE 40 34 545 A1 has made known a two-piece retaining member of a plastic for holding at least one tubular component that has an outer cup of a hard material mountable on a support via a retaining area and an inner cup of a soft material inserted therein which has at least one bearing point to receive the tubular component. To prevent the transmission of vibrations onto a support via the tubular component, the inner cup is mounted on the outer cup via an anchoring device on either side of the bearing point and a continuous clearance exists between the inner cup and the outer cup in the area of the bearing point.

An annularly shaped inner cup can present a thickened area, which reduces the size of the insertion opening, on either side of the bearing point. This allows to tilt the tubular component into the respective bearing point and to hold it therein with ease. Further, a rib which is opposed to the insertion opening can be disposed at the inner circumference of the annular component so that the tubular component is supported only at some points in the bearing point of the inner cup made of a soft material, which also ensures advantageously that vibrations be damped. The ribs are of a compact cross-section.

The known retaining member still leaves a great deal to be desired with regard to the isolation of the pressure surges transmitted from the support via the lines.

Accordingly, it is the object of the invention to provide a retaining element of a plastic which enables the pressure surges transmitted via the lines to be isolated better from the support.

The object is achieved by a retaining element having the features of claim 1. Advantageous aspects of the retaining element are indicated in the dependent claims.

The inventive retaining element of a plastic, which is useful for holding at least one line on a support, has
  a basic body with a mounting area for mounting on the support and at least one retaining area with at least one line seating for at least one line, and
  a line seating which, at the inside, has a plurality of resilient ribs which project beyond the inside at different overhangs.

A line can be inserted into the line seating that is supported only on one or more ribs having a larger overhang beyond the inside of the line seating, but not on one or more ribs having a smaller overhang. The ribs having the larger overhang exhibit a smaller spring constant than does the basic body. Basic bodies which virtually are rigid are also incorporated. As a result, the transmission of pressure surges onto the basic body from the line will be reduced to a particularly large degree.

However, the ribs having the larger overhang are more sensitive to mechanical loads and exhibit a smaller self-centering action because of lower restoring forces than those of the ribs having a smaller overhang. Loads which could result in a damage to or destruction of the ribs having the larger overhang can occur, for example, while a line is pushed into the line seating or in operation by the effect of bumps or distortion. The ribs having the larger overhang are protected against such stresses by the fact that the line, when major deformations occur on the ribs having the larger overhang, additionally come to bear on ribs having the smaller overhang. In case of overload, it is primarily the ribs having the smaller overhang which will then absorb major forces. As a result, the ribs are protected from overload and a large restoring force is ensured. To this effect, the ribs having the smaller overhang preferably exhibit a spring constant which is at least as large or is larger than do the ribs having the larger overhang. The invention also incorporates the formation of the ribs having the smaller overhang at a spring constant which is so high that they nearly act like rigid stops.

Thus, this improves an acoustic isolation significantly in a normal operation while avoiding any damage to the ribs in case of an overload by large forces or transverse distortion, and ensures a high self-centering effect via large restoring forces. This also ensures that cases of distortion do not lead to a contact between the brake line and the rigid basic body, thus safely maintaining an excellent acoustic isolation.

The basic body and the ribs can be made of the same plastic material where different spring constants can be due to the configuration of the ribs and basic body. In an aspect, the line seating has a lining which is made of a non-rigid plastic material or rigid plastic material with a non-rigid elastic feature which, at the inside, has a plurality of resilient ribs which project beyond the inside at different overhangs. The different spring constants of the ribs and basic body can be owing here, at least partially, to the different plastic materials. In an aspect, the ribs are arranged at least partially in parallel. It is preferred to arrange all of the ribs in parallel. This has advantages in the manufacturing process.

In an aspect, the ribs are oriented in the axial direction of the line seating, i.e. in parallel with a conductor to be inserted in the line seating. In another aspect, the ribs are oriented in the circumferential direction of the line seating, i.e. around a conductor to be inserted in the line seating. For example, their progression is annular or in the form of a helix, and is possibly interrupted in the area of an insertion slot of the line seating.

In an aspect, ribs or sets of several ribs alternately project at a larger and a smaller overhang beyond the inside of the line seating or the lining, as seen in a circumferential direction or an axial direction of the line seating. This ensures that forces can be absorbed which are exerted by the line in different directions.

In an aspect, the ribs which project at the larger and the smaller overhangs are disposed at a uniform spacing across the inner circumference or in the axial direction of the line seating or the lining. This also favours the support of forces exerted by the line.

In an aspect, the line seating is formed in a substantially cylindrical, elastic cup having an insertion slot for the line. This makes it possible to install the line by simply pushing it into the insertion slot while elastically expanding the cup when it is safely seated in the elastically contracting cup.

In an aspect, the line seating or the lining has an axially oriented rib projecting at a larger overhang, on either side adjacent to the insertion slot. This favours the uniform support for an installed line at the circumference and counteracts its non-intended exiting from the insertion slot.

The measures below further improve such acoustic isolation while the ribs are protected against overload:

In an aspect, the ribs projecting at the larger overhang are of a width which is smaller than that of the ribs projecting at the smaller overhang.

Further, acoustic isolation is favoured by an aspect in which the overhang of the ribs projecting at the larger overhang is larger than the width of the ribs.

Further, acoustic isolation is favoured by an aspect in which the overhang of the ribs projecting at the smaller overhang is smaller than the width of the ribs.

The dimensional relationships of the ribs according to the foregoing aspects are particularly beneficial for ribs on a lining made of a non-rigid plastic material or rigid plastic material with a non-rigid elastic feature, e.g. a thermoplastic elastomer (TPE).

A great variety of rigid plastic materials can be chosen for the basic body. In an advantageous aspect, the lining is manufactured from a thermoplastic elastomer.

The mounting area can be mounted on the support in different ways. For this purpose, the mounting area can have a seating for or including a fixing bolt or rivet. In addition, the mounting area can be fixedly joined to a fixing bolt or rivet. The fixing bolt or rivet can be anchored in a seating of the support.

BRIEF DESCRIPTION OF THE DRAWING

The invention will be described in more detail below with reference to the accompanying drawings of an embodiment. In the drawings:

FIG. 3 shows some part of a retaining area in an enlarged side view;

FIG. 4 shows the same retaining member in a side view prior to being positioned on a welding bolt;

FIG. 5 shows the same retaining member while being positioned on a welding bolt in the same view;

FIG. 6 shows the same retaining member in one of the final mounting positions on the welding bolt in the same view.

DETAILED DESCRIPTION OF THE PREFERRED EMBODIMENTS

Figure 1:
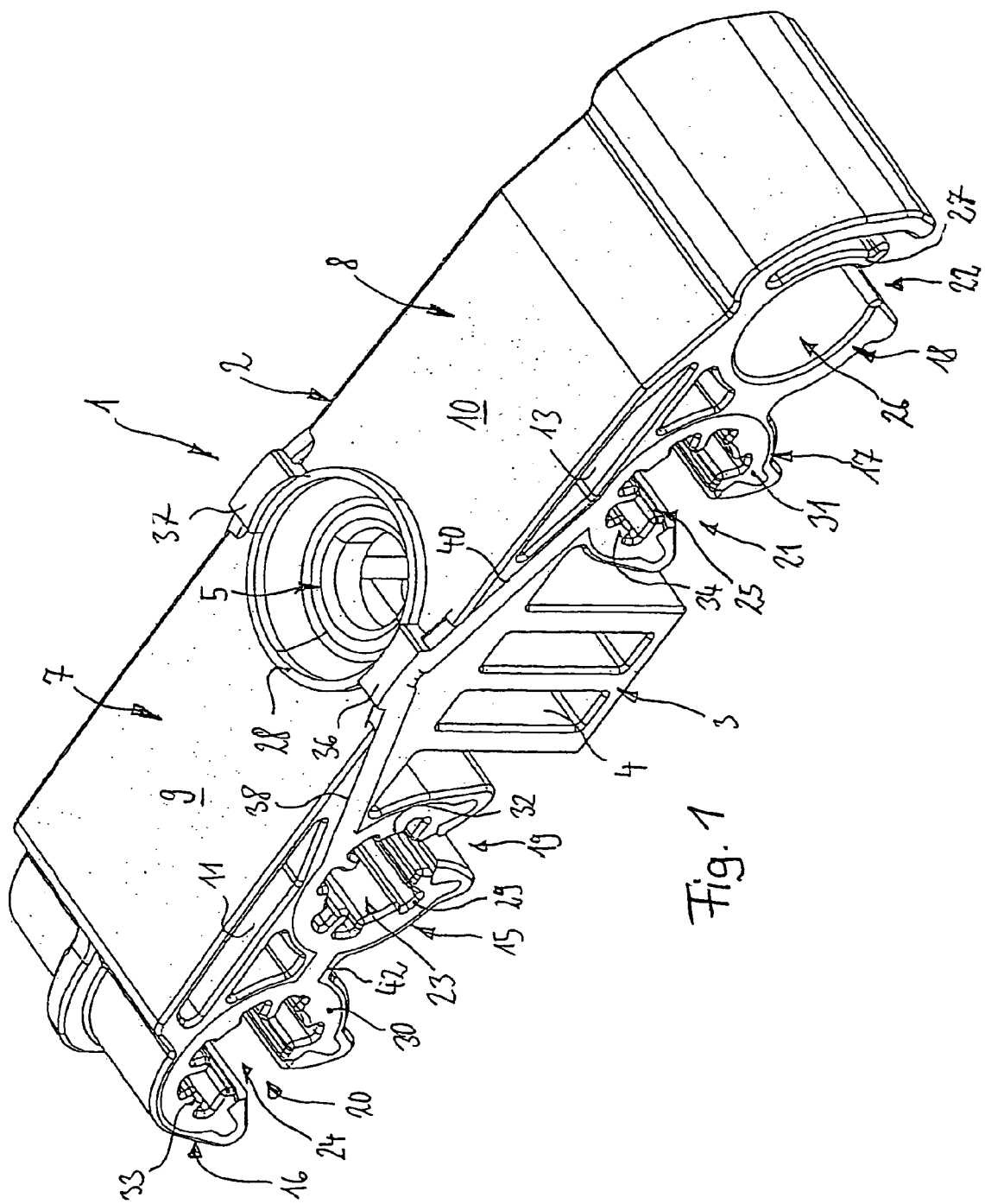
FIG. 1 shows the retaining member in a perspective view oblique to the side to be placed against the support.
Figure 2:
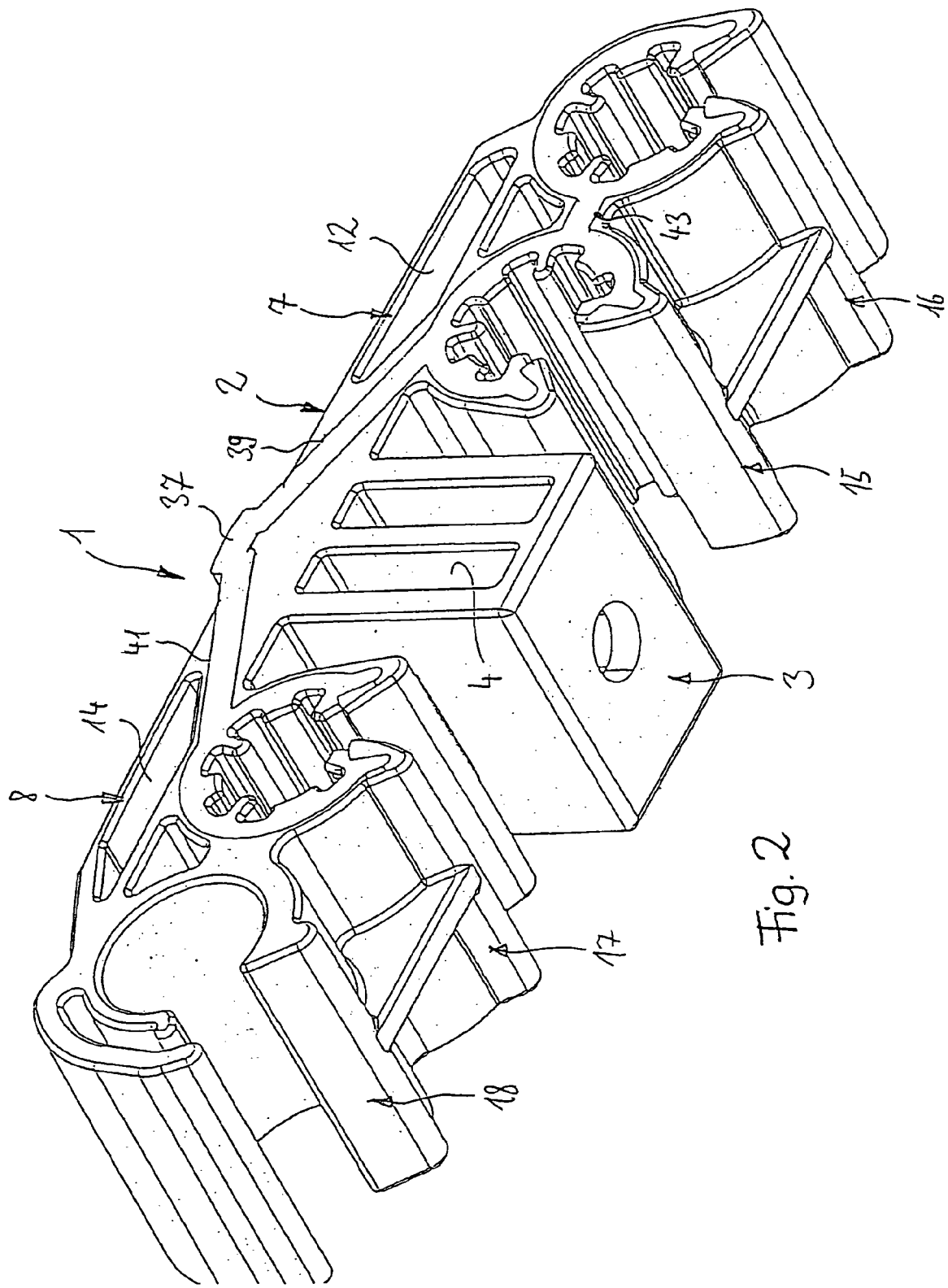
FIG. 2 shows the same retaining member in a perspective view oblique to the opposite side.

The inventive retaining member 1 has a basic body 2 of a rigid plastic material. For example, this is a PA. (e.g. PA 6.6 or PA. 6).

The basic body 2 comprises a central mounting area 3 which is formed in a box shape or cage shape. A seating 4 for a fixing bolt is located in the mounting area 3. The seating 4 is accessible through a hole 5 in that side of the mounting area 3 which faces the support. The seating 4 has disposed therein two groups of parallel lamellae 6 which are on two opposed sides and are inclined towards the hole 5 on either side.

Retaining areas 7, 8 extend away from two opposed sides of the mounting area 3. The areas comprise an approximately plate-shaped retaining arm 9, 10 each which, starting from the two narrow sides, exhibit pocket-shaped cavities 11, 12, 13, 14. The retaining arms 9, 10 extend from that side of the mounting area 3 which is to be placed against the support.

The arms each carry two clamping members 15 to 18 on the side to be faced away from the support. The members are designed as elastically expandable cups having an insertion slot 19 to 22 each. They house a line seating 23 to 26 each. The seating is confined by an additional clamping tongue 27 in the clamping member 18.

Finally, at the side to be placed against the support, the mounting area 3 has a ring-shaped projection 28, which extends around the hole 5.

The aforementioned components of the retaining member 1 are made of a rigid plastic material. They may be advantageously injection-moulded in a single operation.

The clamping members 15 to 17 have linings 29 to 31 of a non-rigid plastic material. The linings 29 to 31 have ribs 32 to 34 which project each from their insides. The ribs extend in parallel with the insertion slots 19 to 21 and, hence, in parallel with the lines to be inserted. Several of them are disposed in sets over the inner circumference of the clamping members 15 to 17.

Each lining 29 to 31 has two different sets of ribs 32 to 34: ribs 32' to 34' projecting at a larger overhang a (than do the ribs 32" to 34") beyond the insides of the linings 29 to 31 and having a smaller width b (than have the ribs 32' to 34'). It further has ribs 32" to 34" projecting at smaller overhang c (than do the ribs 32' to 34') beyond the insides of the linings 29 to 31 and having a larger width d (than have the ribs 32' to 34'). This is illustrated in FIG. 3 by way of the clamping member 16.

The clamping member 18 has no lining.

On diametrically opposed sides of the hole 5 and outside the ring-shaped projection 28, the mounting area 3 carries rib-shaped contact members 36, 37 on the side to be faced to the support. They extend slightly towards the two retaining arms 9, 10. They project at an overhang father beyond the side to be faced to the support than does the ring-shaped projection 28. They are of a cambered design with their apex being approximately in the transverse central plane of the hole 5 and the overhang decreasing towards the retaining arms 9, 10. They together define a contact area 36, 37.

Two channels 38 to 41 are located on the two outer surfaces of the basic body between the contact members 36, 37 and the linings 29, 31. Furthermore, the linings 29 and 30 are interconnected by channels 42, 43 in the sides of the basic body 2. The linings 29, 31 and the contact members 36, 37 are made of the same non-rigid plastic material. The channels 38 to 43 are also filled with this plastic material. Thus, all of the non-rigid components of the retaining member 1 can be injection-moulded in a single step.

The assembly and function of the retaining member 1 will be described below:

According to FIG. 4, the retaining member 1 aligns the hole 5 onto a welding bolt 44 which is welded perpendicularly onto a sheet-like support 45.

According to FIG. 5, the retaining member 1 is pushed onto the welding bolt 44. AS a result, the lamellae 6 will be slightly bent apart.

According to FIG. 6, the retaining member 1 has seated its contact elements 36, 37 on the support 45 at the end of assembly. The contact elements 36, 37 are slightly compressed. The ring-shaped projection 28 is at a distance from the support 45. The retaining arms 9, 10 are at an even larger distance. The lamellae 6 prevent the retaining member 1 from slipping back from the welding bolt 44 or retain the retaining member 1 in place in a mounting position on the welding bolt 44 in a cooperation with a contoured area (e.g. a thread profile) on the welding bolt 44.

Lines oriented perpendicularly to the plane of the drawing are pushed into the clamping members 15 to 18 through the insertion slots 19 to 22. The clamping members 15 to 18 receive lines through which pressure surges are transmitted. The clamping member 18 is destined for the reception of a line through which no pressure surges pass.

The pressure surges are attenuated by the non-rigid linings 29 to 31. To this effect, the lines are normally supported on the ribs 32' to 34'. In case of particularly intense pressure surges or additional actions of force, the ribs 32' to 34' can be at least partially compressed in such a way that the lines come to bear on some portion of the ribs 32" to 34". They will then support the additional lines.

This achieves an acoustic isolation of the lines from the support 45 that has not been attained hitherto.

The invention claimed is:

1. A retaining member for holding and supporting an elongated element from a support, said retaining member comprising:
    a base portion attachable to the support; and
    a holding portion connected to said base portion and comprising a recess for holding the elongated element therein, said recess comprising:
    a tubular portion; and
    a plurality of spaced ribs extending radially inwardly from said tubular portion to have different radial heights, wherein:
    said ribs comprise at least one first rib having a first radial height and a plurality of second ribs having a second radial height smaller than the first radial height;
    said holding portion further comprises an elongated slot for allowing insertion of the elongated element into said recess via said elongated slot; and
    said elongated slot has opposite elongated edges extending in an axial direction of said tubular portion and said first rib is spaced, in a circumferential direction of said tubular portion, from each of the edges of said elongated slot by at least one of said second ribs; and
    further comprising a further holding portion connected to said base portion and comprising a further recess for holding another elongated element therein, said further recess having a smooth inner surface free of ribs or teeth; and
    wherein said holding portions are positioned on opposite sides of said base portion.

2. The retaining member as claimed in claim 1, wherein said ribs are elongated in a circumferential direction of said tubular portion.

3. The retaining member as claimed in claim 2, wherein said base portion is made of a harder plastic material and said ribs and said tubular portion are made of a softer plastic material.

4. The retaining member as claimed in claim 2, wherein said elongated ribs describe circular or helical curves.

5. The retaining member as claimed in claim 2, wherein said ribs are disposed at a uniform spacing in an axial direction of said tubular portion.

6. The retaining member as claimed in claim 2, wherein said ribs include first ribs having a greater radial height and second ribs having a smaller radial height, and wherein said first and second ribs are alternatingly arranged in an axial direction of said tubular portion.

7. The retaining member as claimed in claim 2, wherein said ribs include first ribs having a first radial height and second ribs having a second radial height smaller than the first radial height, and wherein a first width of said first ribs at tops thereof is smaller than a second width of said second ribs at tops thereof.

8. The retaining member as claim in claim 7, wherein the first radial height of said first ribs is greater than the first width at the tops of said first ribs.

9. The retaining member as claimed in claim 7, wherein the second radial height of said second ribs is smaller than the second width at the tops of said second ribs.

10. The retaining member as claimed in claim 1, wherein said first and second ribs are elongated in the axial direction of said tubular portion, and alternatingly arranged in the circumferential direction of said tubular portion with a uniform spacing.

11. The retaining member as claimed in claim 1, wherein said first and second ribs are elongated in the axial direction of said tubular portion and alternatingly arranged in the circumferential direction of said tubular portion, and wherein said alternatingly arranged ribs include at least three said first ribs and at least three said second ribs.

12. The retaining member as claimed in claim 1, wherein said holding portion includes at least three said first ribs two of which are arranged along the edges of said slot.

13. The retaining member as claimed in claim 1, wherein a first width of said first rib at a top thereof is smaller than a second width of said second ribs at tops thereof.

14. The retaining member as claim in claim 13, wherein the first radial height of said first rib is greater than the first width at the top of said first rib.

15. The retaining member as claimed in claim 13, wherein the second radial height of said second ribs is smaller than the second width at the tops of said second ribs.

16. The retaining member as claimed in claim 1, wherein a top of said first rib describes a convex curve and tops of said second ribs describe concave curves.

17. A retaining member for holding and supporting an elongated element from a support, said retaining member comprising:
    a base portion attachable to the support; and
    a holding portion connected to said base portion and comprising a recess for holding the elongated element therein, said recess comprising:
    a tubular portion; and
    a plurality of spaced ribs extending radially inwardly from said tubular portion to have different radial heights, wherein
    said ribs comprise at least one first rib having a first radial height and a plurality of second ribs having a second radial height smaller than the first radial height;
    said holding portion further comprises an elongated slot for allowing insertion of the elongated element into said recess via said elongated slot;
    said elongated slot has opposite elongated edges extending in an axial direction of said tubular portion and said first rib is spaced, in a circumferential direction of said tubular portion, from each of the edges of said elongated slot by at least one of said second ribs; and
    said base portion is made of a harder plastic material and said first and second ribs are made of a softer plastic material; and
    further comprising a resilient contact element adapted to bear against a surface of the support when said base position is attached to the support, said resilient contact element being made from the same plastic material as said first and second ribs.

18. In combination,
    an elongated element; and a retaining member for holding and supporting said elongated element from a support, said retaining member comprising:

a base portion attachable to the support; and a holding portion connected to said base portion and comprising a recess holding the elongated element therein, said recess comprising:

a tubular portion; and a plurality of spaced ribs extending radially inwardly from said tubular portion, said ribs including at least a first rib having a first radial height and at least a second rib having a second radial height smaller than the first radial height;

wherein said elongated element is resiliently supported in said recess by said first rib to be radially spaced from said second rib and said tubular portion, said first rib being elastically deformable to allow said elongated element to come to rest on said second rib without allowing said elongated element to contact said tubular portion and said base portion; and further comprising:

a support to which said base portion is attached; and a resilient contact element that bears against the support and spaces said base portion from said support;

wherein said base portion is made of a harder plastic material whereas said first and second ribs, said tubular portion and said resilient contact element are made of a softer plastic material.

19. A retaining member for holding and supporting an elongated element from a support, comprising:

a base portion attachable to a support;

a first clamping member connected to the base portion and comprising an elastically expandable cup having a single curved wall and an insertion slot adapted to have a first elongated element inserted therethough;

an injected molded non-rigid plastic lining injected molded into direct contact with the single curved wall of the expandable cup and configured to receive the elongated element therein, the lining comprising:

a plurality of first and a plurality of second spaced ribs extending radially inwardly from the lining, each of the first plurality of ribs being arranged beside one of the plurality of second spaced ribs, each of the plurality of first ribs being longer and thinner than each of the plurality of second ribs and having a greater overhang than each of the plurality of second ribs, whereby each of the first plurality of ribs extends further toward a center of the lining than each of the plurality of second ribs, each of the plurality of first ribs being configured to have a lower spring constant, to be more sensitive to mechanical loads and exhibit a smaller self-centering action than each of the second plurality of ribs.

20. A retaining member as claimed in claim 19, wherein the clamping member is made of a rigid material.

21. A retaining member as claimed in claim 19, wherein the first plurality of ribs are each longer and narrower than the second plurality of ribs and configured to be deflected during the insertion of the elongated element into the lining to the degree they bear, at least temporarily, on the second plurality of ribs.

22. A retaining member as claimed in claim 19, wherein at least the deflection of the plurality of first ribs provides an acoustical isolation effect between the elongate element and the support.

23. A retaining member as claimed in claim 19, wherein in the case of a force being exerted by the elongate element on the plurality of first ribs and the plurality of second ribs, the plurality of second ribs are configured to be deflected to a lesser degree than the plurality of first ribs and therefore absorb a larger amount of the force than the plurality of first ribs.

24. A retaining member as claimed in claim 19, wherein the plurality of second ribs are configured to act as rigid stops.

25. A retaining member as claimed in claim 19, further comprising a second clamping member comprising an unlined expandable cup having a smooth inner surface, an insertion slot adapted to have a second elongated element inserted therethrough, and a clamping tongue arranged within the unlined expandable cup.

* * * * *